United States Patent
Breneur et al.

(10) Patent No.: US 6,748,730 B2
(45) Date of Patent: Jun. 15, 2004

(54) HAYMAKING MACHINE WITH TELESCOPIC CARRIER ARMS

(75) Inventors: David Breneur, Saverne (FR); Frédéric Kohser, Westhoffen (FR)

(73) Assignee: Kuhn S.A., Saverne Cedex (FR)

( * ) Notice: Subject to any disclaimer, the term of this patent is extended or adjusted under 35 U.S.C. 154(b) by 0 days.

(21) Appl. No.: 10/234,154

(22) Filed: Sep. 5, 2002

(65) Prior Publication Data

US 2003/0041584 A1 Mar. 6, 2003

(30) Foreign Application Priority Data

Sep. 6, 2001 (FR) ............................. 01 11659

(51) Int. Cl.⁷ ..................... A01D 76/00; A01D 78/00; A01D 80/00; A01D 84/00
(52) U.S. Cl. ..................... 56/367; 56/377; 56/379
(58) Field of Search ..................... 56/367, 377, 379, 56/396, 384, 397, 398, 372, 374, 370, 380

(56) References Cited

U.S. PATENT DOCUMENTS

| 3,552,773 A | * | 1/1971 | Purrer et al. ............. 280/413 |
| 4,621,487 A | * | 11/1986 | Urlacher et al. ............. 56/228 |
| 4,723,404 A | * | 2/1988 | Aron ............................ 56/370 |
| 4,926,619 A | * | 5/1990 | Ungruh et al. ............... 56/15.4 |
| 5,069,022 A | | 12/1991 | Vandermark |

FOREIGN PATENT DOCUMENTS

| DE | 199 16 759 A1 | 10/2000 | |
| EP | 406140 A1 * | 1/1991 | ........... A01B/23/04 |
| EP | 0 517 632 A1 | 12/1992 | |
| EP | 1 095 555 A1 | 5/2001 | |

* cited by examiner

*Primary Examiner*—Árpád Fab Kovács
(74) *Attorney, Agent, or Firm*—Oblon, Spivak, McClelland, Maier & Neustadt, P.C.

(57) ABSTRACT

A haymaking machine for windrowing forage includes a frame carrying several rotors connected to carrier arms which are articulated to the frame and which can be moved from a work position into a transport position. The carrier arms are made as two telescopic parts of which the second carries the corresponding rotors and can slide with respect to the first part to vary the position of the corresponding rotor. The first telescopic part of at least one carrier arm includes an additional guide section making it possible to increase the distance over which the second part with the corresponding rotor can move.

9 Claims, 4 Drawing Sheets

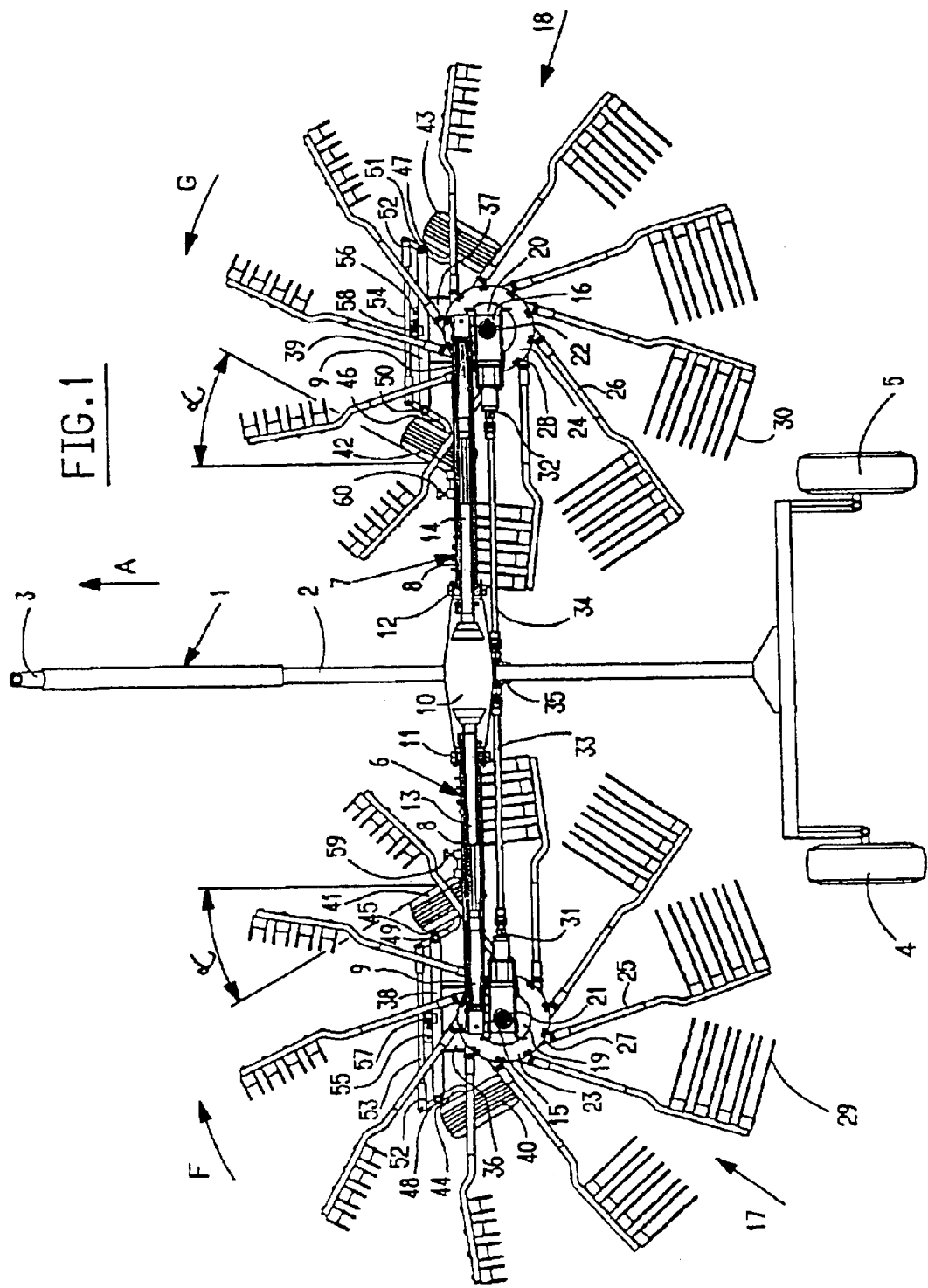

HAYMAKING MACHINE WITH TELESCOPIC CARRIER ARMS

BACKGROUND OF THE INVENTION

1. Field of the Invention

The present invention relates to a haymaking machine, particularly for windrowing forage, comprising a frame carrying several windrowing rotors which can be driven in rotation about substantially vertical support axes, which rotors are connected to carrier arms which are articulated to the frame by means of articulation axes about which they can be moved from a substantially horizontal work position into a substantially vertical transport position and vice versa, said carrier arms being made as two telescopic parts of which the first is connected to the axis of articulation on the frame and the second carries the corresponding rotor, it being possible for this second part to slide with respect to said first part in order to vary the position of the corresponding rotor with respect to the frame between an inner position in which its support axis is located a minimum distance from the articulation axis of the corresponding carrier arm and an outer position in which its support axis is located a maximum distance from said articulation axis.

2. Discussion of the Background

A known machine of this kind comprises four rotors arranged in such a way as to form a first pair which is situated toward the front of the frame and a second pair which is situated toward the rear of the frame. In the work position, these rotors form a V and gather the forage together into a central windrow. The maximum working width is achieved when the telescopic parts of the carrier arms are entirely deployed to bring the rotors into their outer positions. This maximum working width depends on the travel of the second parts of the telescopic arms which carry the rotors situated toward the front of the frame. Said travel is, however, limited by the fact that, in the deployed position, it is necessary to maintain a correct overlap between the first and the second telescopic parts of the carrier arms and by the fact that the length of said parts is also limited in order not, in the transport position, to exceed the permitted height for travel on the public highway.

The maximum working width which can thus be obtained with this known machine is not sufficient to form, in a single pass, a windrow the volume of which is suited to the great processing capacity of machines such as the self-propelled forage harvesters currently available.

In another known machine, each arm carrying one of the rotors of the first pair is mounted on an additional chassis. The latter can be moved laterally on the main frame of the machine with a view to being able to increase the maximum working width. Such a construction makes the machine considerably more complicated and considerably more expensive.

SUMMARY OF THE INVENTION

It is an object of the present invention to overcome the aforementioned drawbacks of the known machines. The invention has in particular to propose a machine that makes it possible, in a simple way, to obtain a very wide working width.

To this end, a significant feature of the invention consists in the fact that the first telescopic part of at least each arm carrying one of the rotors of the first pair comprises an additional guide section which extends in its continuation beyond the support axis of the corresponding rotor when the latter is located in the inner position and the length of which is such that it allows the second telescopic part to be guided as far as an outer position in which the value of the distance from the support axis of the rotor to the axis of articulation of the corresponding carrier arm is substantially twice the value of this distance when the rotor is in said inner position.

This arrangement makes it possible in a simple way to double the working width of the machine by moving it from the minimum position to the maximum position. In the latter position, the machine can produce windrows of very large volume on each pass. Furthermore, when placed in the transport position, the carrier arms can maintain the length they have in the minimum position. The height thus achieved with these arms remains within the limits allowed for transport.

BRIEF DESCRIPTION OF THE DRAWINGS

Other features and advantages of the invention will become apparent from the claims and from the description which follows of a nonlimiting exemplary embodiment of the invention, with reference to the appended drawings in which:

DESCRIPTION OF THE PREFERRED EMBODIMENT

Figure 2:
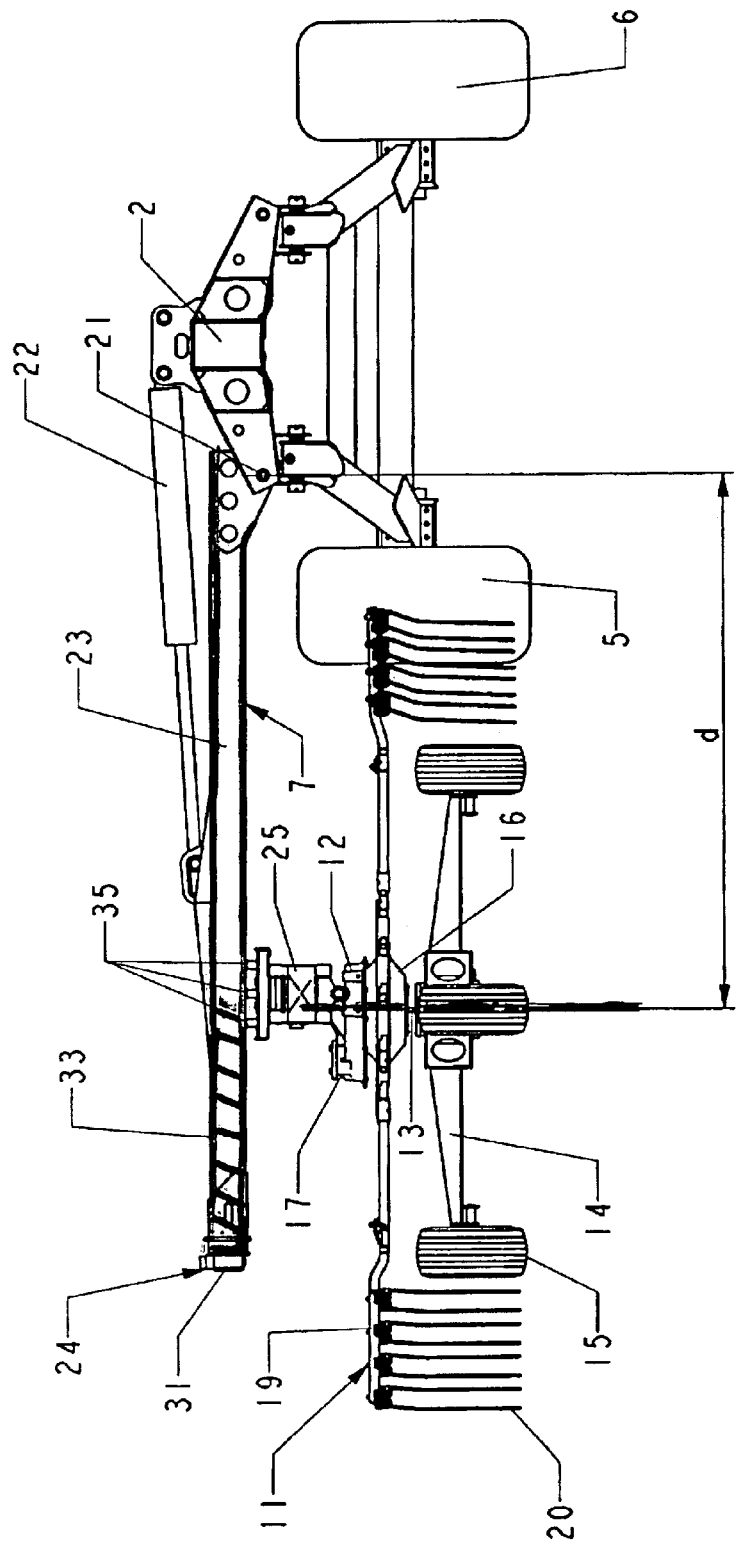
FIG. 2 depicts a detailed view of a carrier arm in the minimum position.

As depicted in FIGS. 1 to 4, the machine according to the invention comprises a frame 1. This consists of a central beam 2 which, at its front end, has a coupling device 3 for attaching it to a tractor that drives it and, toward its middle, has a cross-beam 4 with two landwheels 5 and 6 which rest on the ground. The frame 1 comprises four arms 7, 8, 9, 10 each carrying a rotor 11 intended to windrow products such as cut grass or straw lying on the ground.

Each rotor 11 has a casing 12 which is connected to the corresponding carrier arm 7, 8, 9, 10 in a way which will be described later on. Housed in this casing 12 is a substantially vertical support axis 13. This axis 13 extends downward and at its lower end bears a carriage 14 equipped with bearing wheels 15 situated under the rotor 11. Arranged on the part of the axis 13 which lies between the casing 12 and the carriage 14 is a box 16. It is mounted on the support axis 13 in such a way that it can rotate thereon. The upper side of the box 16 is equipped with a toothed annulus which lies under the casing 12. This annulus meshes with a drive pinion which also lies under the casing 12. Said pinion is secured to a shaft which extends from this casing 12 and which is connected to a hydraulic motor 17 which drives it in rotation. Said shaft could also be connected, via transmission shafts, to a power take-off of the tractor.

The box 16 is equipped with bearings 18 through which arms 19 pass. These arms extend in the form of rays and at their outer ends carry windrowing tools 20 consisting of forks. They are housed in said bearings 18 in such a way as to be able to rotate on themselves.

Mounted on the part of the axis 13 which is located in the box 16 is a fixed cam intended to operate the tool-carrier arms 19 during windrowing work. For this, each of these arms 19 has, at its end which extends into the box 16, a lever with a roller which is guided in a known manner in a groove of the cam.

The carrier arms 7, 8, 9, 10 are articulated to the central beam 2 by means of articulation axes 21 which are substantially horizontal and directed in the direction of forward travel A. Associated with each carrier arm 7, 8, 9 and 10 is a hydraulic ram 22 which allows it to be moved about its articulation axis 21 to bring it from a substantially horizontal work position into a substantially vertical transport position and vice versa. These hydraulic rams 22 are articulated to the corresponding carrier arm 7, 8, 9 or 10 and to the beam 2. They may be connected to the hydraulic device of the tractor and controlled therefrom.

Two carrier arms 7 and 8 are situated toward the front of the central beam 2 and the other two arms 9 and 10 are situated toward the rear thereof. They are all produced as two telescopic parts 23 and 24. The first part 23 is connected to the axis 21 of articulation on the beam 2 and the second part 24 carries the corresponding rotor 11. The latter is connected to this second part 24 by means of an articulated connection device 25 allowing it to follow the unevenness of the ground. Each second part 24 can slide with respect to the first part 23 to vary the position of the corresponding rotor 11 with respect to the beam 2 between an inner position in which its support axis 13 is located a minimum distance d from the axis 21 of articulation on the beam 2 and an outer position in which its support axis 13 is located a maximum distance D from said articulation axis 21. The first telescopic part 23 of each carrier arm 7, 8, 9 and 10 is made as two tubes 26 and 27 which are substantially parallel and joined together by cross-beams 28. The second telescopic part 24 of each carrier arm 7, 8, 9 and 10 is also produced as two tubes 29 and 30 which are substantially parallel and joined together by a cross-beam 31 located near their outer ends. These tubes 29 and 30 are engaged in the aforementioned tubes 26 and 27 of the first part 23 and can slide therein. Each carrier arm 7, 8, 9 and 10 comprises a hydraulic ram 32 which is connected to the cross-beam 28 located near the inner end of the first telescopic part 23 and to the cross-beam 31 located near the outer end of the second telescopic part 24. This ram 32 is advantageously located between the tubes 26, 27, 29 and 30 which constitute the telescopic parts 23 and 24. These hydraulic rams 32 move the second telescopic parts 24 to lengthen or shorten the carrier arms 7, 8, 9 and 10. For that, they may be connected, by means of hoses, to the hydraulic device of the tractor.

The first telescopic parts 23 of the carrier arms 7 and 8 situated furthest toward the front of the beam 2 comprise an additional guide section 33 which extends in its continuation beyond the support axis 13 of the corresponding rotor 11 when the latter is in the inner position. The length of each guide section 33 is such that it allows the second telescopic part 24 to be guided as far as a position in which the value of the distance D is substantially twice the value of the distance d. This additional guide section 33 continues the first telescopic part 23 by a length equal to approximately half the distance d. It is in the form of tubes similar to the tubes 26 and 27 with, on their side facing downward, openings 34 which run along practically their entire length (see FIG. 4). Through these openings 34 there pass fixing lugs 35 which connect the articulated link device 25 of the corresponding rotor 11 to the second telescopic part 24. This second part 24 has substantially the same length as the first part 23 including the guide section 33. Guidance between the two parts is thus optimum in all positions. In addition, the hydraulic ram 32 which moves the second part 24 is relatively long, and this allows it to have a long travel.

The aforementioned arrangement makes it possible to lengthen the carrier arms 7 and 8 by a distance such that the working width can be doubled between the inner position and the outer position. It also makes it possible to shorten them enough that, in the transport position, they do not exceed the authorized height.

During work, the machine is moved in the direction of forward travel A. The carrier arms 7 to 10 are lowered into a substantially horizontal position and the wheels 15 of the rotors 11 run along the ground. These rotors 11 are arranged in such a way as to form a V (see FIG. 1). They are driven in rotation in such a way that they rotate in the direction of the arrows F and G. The tools 20 of the two rotors 11 furthest forward are controlled by their respective cams in such a way that they gather together the forage over the front halves of their paths, move it toward the beam 2 and deposit it in the form of windrows. The tools 20 of the two rotors 11 furthest toward the rear are controlled in a similar way. They pick up all the forage lying in their paths, including that deposited by the two previous rotors, and gather it together to form a large-volume central windrow.

The working width obtained with the rotors 11 can be modified using the telescopic carrier arms 7 to 10 particularly as a function of the treatment capability of the bailer or forage harvester used to pick up the windrow. To increase the volume of the windrow, the two arms 7 and 8 of the rotors 11 furthest forward can be lengthened in such a way as to bring the corresponding rotors into the outer position in which the working width is practically doubled by comparison with the inner position. In this outer position, the second telescopic parts 24 of the carrier arms 7 and 8 are held by the additional guide sections 33. The working width can then be close on fifteen meters. In their inner position, said rotors 11 lie beneath the additional guide sections 33, their fixing lugs 35 passing through the openings 34. The minimum working width is thus not limited by the length of said part 23 and section 33 which serves to guide the second parts 24.

The working width of the two rotors 11 furthest toward the rear may be less than that of the rotors 11 furthest forward. The maximum extension of their carrier arms 9 and 10 may thus be relatively short so that the second parts 24 are held correctly in the first parts 23 themselves. Nonetheless, it is possible to provide the same type of carrier arms at the rear as at the front.

For transport, the carrier arms 7 to 10 are shortened as far as possible and lifted up by means of the rams 22 into a substantially vertical position to reduce the size of the machine. This maximum shortening corresponds to the position in which the rotors 11 are brought in as close as possible to the beam 2 and lie at the distance d from the axes of articulation 21 of their carrier arms 7 to 10. In this position, it is also possible for the upwardly directed tool-carrier arms 19 to be taken off or folded so as to reduce the height of the machine still further.

Obviously, the invention is not restricted to the embodiment described hereinabove and depicted in the appended drawings. Modifications remain possible particularly regarding the construction or number of the various elements or by substituting technical equivalents without in any way departing from the field of protection.

What is claimed as new and desired to be secured by Letters Patent of the United States is:

1. A haymaking machine, particularly for windrowing forage, comprising a frame carrying several windrowing rotors which can be driven in rotation about substantially vertical support axes, which rotors are connected to carrier arms which are articulated to the frame by articulation axes about which they can be moved from a substantially horizontal work position into a substantially vertical transport position and vice versa, said carrier arms each being made as two telescopic parts of which the first is connected to the axis of articulation on the frame and the second carries the corresponding rotor, said second part being slidable with respect to said first part in order to vary the position of the corresponding rotor with respect to the frame between an inner position at which a support axis thereof is located a minimum distance d from the articulation axis of the corresponding carrier arm and an outer position at which its support axis is located a maximum distance D from said articulation axis, wherein the first telescopic part of at least one carrier arm comprises an additional guide section which extends in its continuation beyond the support axis of the corresponding rotor when the latter is located in the inner position and the length thereof is equal to approximately half of said distance d so as to allow the corresponding second telescopic part to be guided as far as an outer position in which the value of the distance D is substantially twice the value of the distance d.

2. Machine as claimed in claim 1, comprising two forward rotors and two rearward rotors and wherein the first telescopic parts of the carrier arms of the two furthest forward rotors each include said additional guide section.

3. Machine as claimed in claim 2, wherein the additional guide section of the first telescopic part of the carrier arm of each forward rotor has an opening which extends along the entire length thereof, and wherein the second telescopic part of said carrier arm comprises fixing lugs for the corresponding rotor.

4. Machine as claimed in claim 3, wherein the fixing lugs for the rotor are situated in the opening of the additional guide section of the first telescopic part when the said carrier arm is in the inner position.

5. Machine as claimed in claim 1, wherein the first telescopic part of each carrier arm comprises two tubes which are substantially parallel and connected together by cross-beams, and wherein the second telescopic part of each carrier arm is made as two tubes which are substantially parallel and connected together by a cross-beam located at outer ends of said tubes.

6. Machine as claimed in claim 5, wherein each carrier arm comprises a hydraulic ram which is connected to one of said cross-beams located near the inner end of the first telescopic part and to said cross-beam located at the outer end of the second telescopic part.

7. The machine as claimed in claim 6, wherein said hydraulic ram is located between said tubes which comprise the telescopic parts of each said carrier arm.

8. A haymaking machine, particularly for windrowing forage, comprising a frame carrying several windrowing rotors which can be driven in rotation about substantially vertical support axes, which rotors are connected to carrier arms which are articulated to the frame by articulation axes about which they can be moved from a substantially horizontal work position into a substantially vertical transport position and vice versa, said carrier arms each being made as two telescopic parts of which the first is connected to the axis of articulation on the frame and the second carries the corresponding rotor, said second part being slidable with respect to said first part in order to vary the position of the corresponding rotor with respect to the frame between an inner position in which a support axis thereof is located a minimum distance d from the articulation axis of the corresponding carrier arm and an outer position in which its support axis is located a maximum distance D from said articulation axis, wherein the first telescopic part of at least one carrier arm comprises an additional guide section which extends in its continuation beyond the support axis of the corresponding rotor when the latter is located in the inner position and the length thereof is such as to allow the corresponding second telescopic part to be guided as far as an outer position in which the value of the distance D is substantially twice the value of the distance d, wherein the first telescopic part of each carrier arm comprises two tubes which are substantially parallel and connected together by a cross-beam.

9. A haymaking machine, particularly for windrowing forage, comprising a frame carrying several windrowing rotors which can be driven in rotation about substantially vertical support axes, which rotors are connected to carrier arms which are articulated to the frame by articulation axes about which they can be moved from a substantially horizontal work position into a substantially vertical transport position and vice versa, said carrier arms each being made as two telescopic parts of which the first is connected to the axis of articulation on the frame and the second carries the corresponding rotor, said second part being slidable with respect to said first part in order to vary the position of the corresponding rotor with respect to the frame between an inner position in which a support axis thereof is located a minimum distance d from the articulation axis of the corresponding carrier arm and an outer position in which its support axis is located a maximum distance D from said articulation axis, wherein the first telescopic part of at least one carrier arm comprises an additional guide section which extends in its continuation beyond the support axis of the corresponding rotor when the latter is located in the inner position and the length thereof is such as to allow the corresponding second telescopic part to be guided as far as an outer position in which the value of the distance D is substantially twice the value of the distance d, wherein the second telescopic part of each carrier arm comprises two tubes which are substantially parallel and connected together by a cross-beam located at outer ends of said tubes.

* * * * *

UNITED STATES PATENT AND TRADEMARK OFFICE
CERTIFICATE OF CORRECTION

PATENT NO. : 6,748,730 B2
APPLICATION NO. : 10/234154
DATED : June 15, 2004
INVENTOR(S) : Breneur et al.

Figure 3:
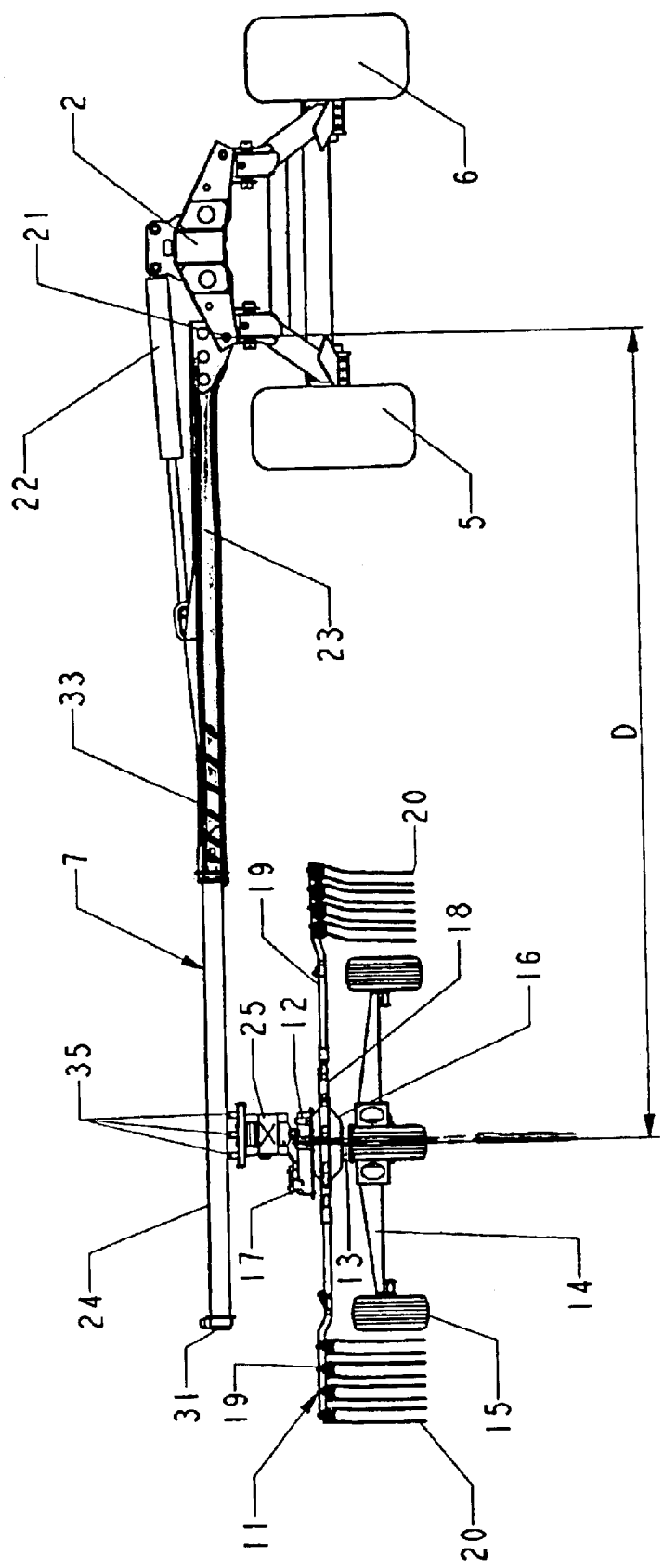
FIG. 3 depicts a detailed view of a carrier arm in the maximum extended position.
Figure 4:
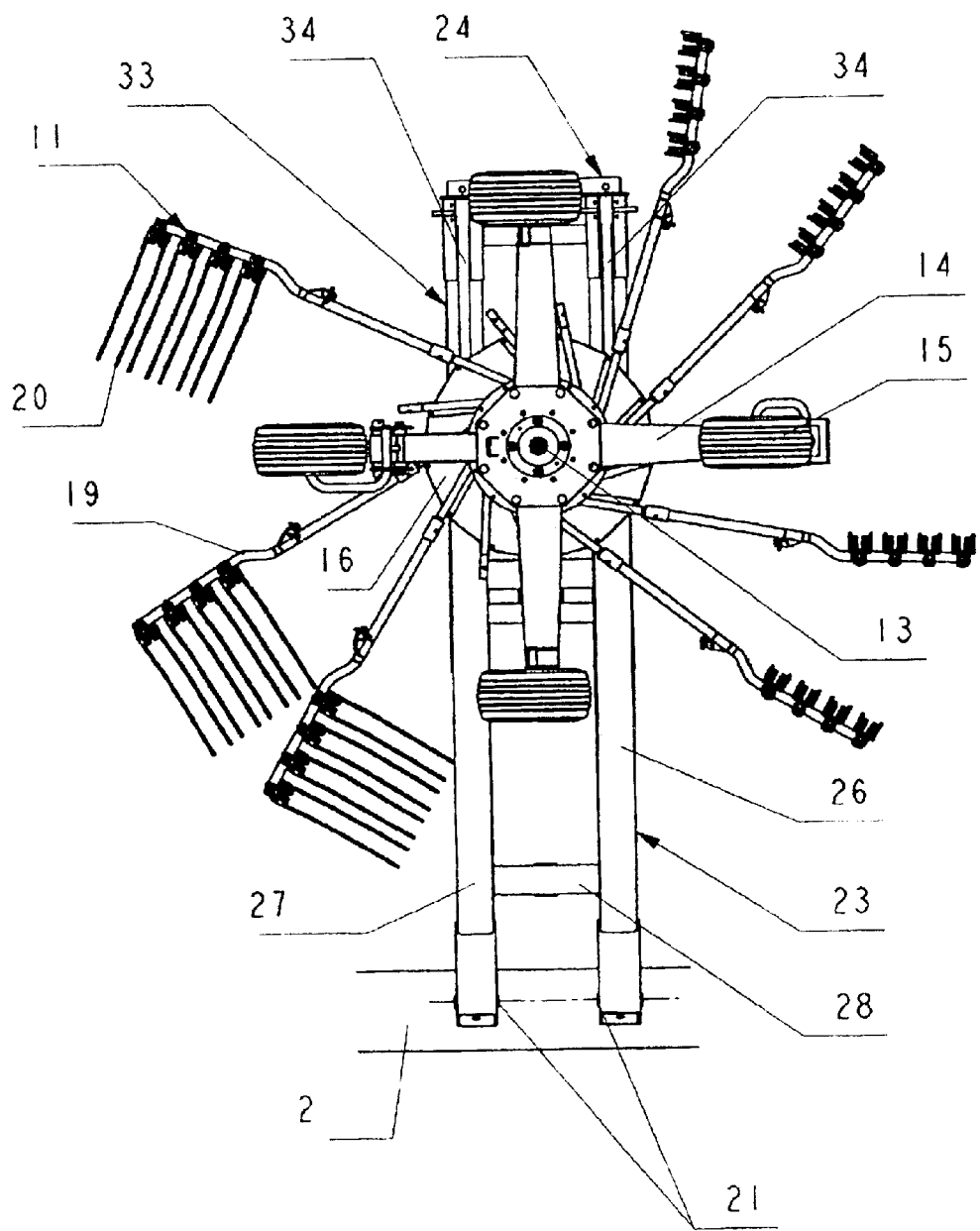
FIG. 4 depicts a detailed view of a carrier arm in the transport position.
Figure 1:
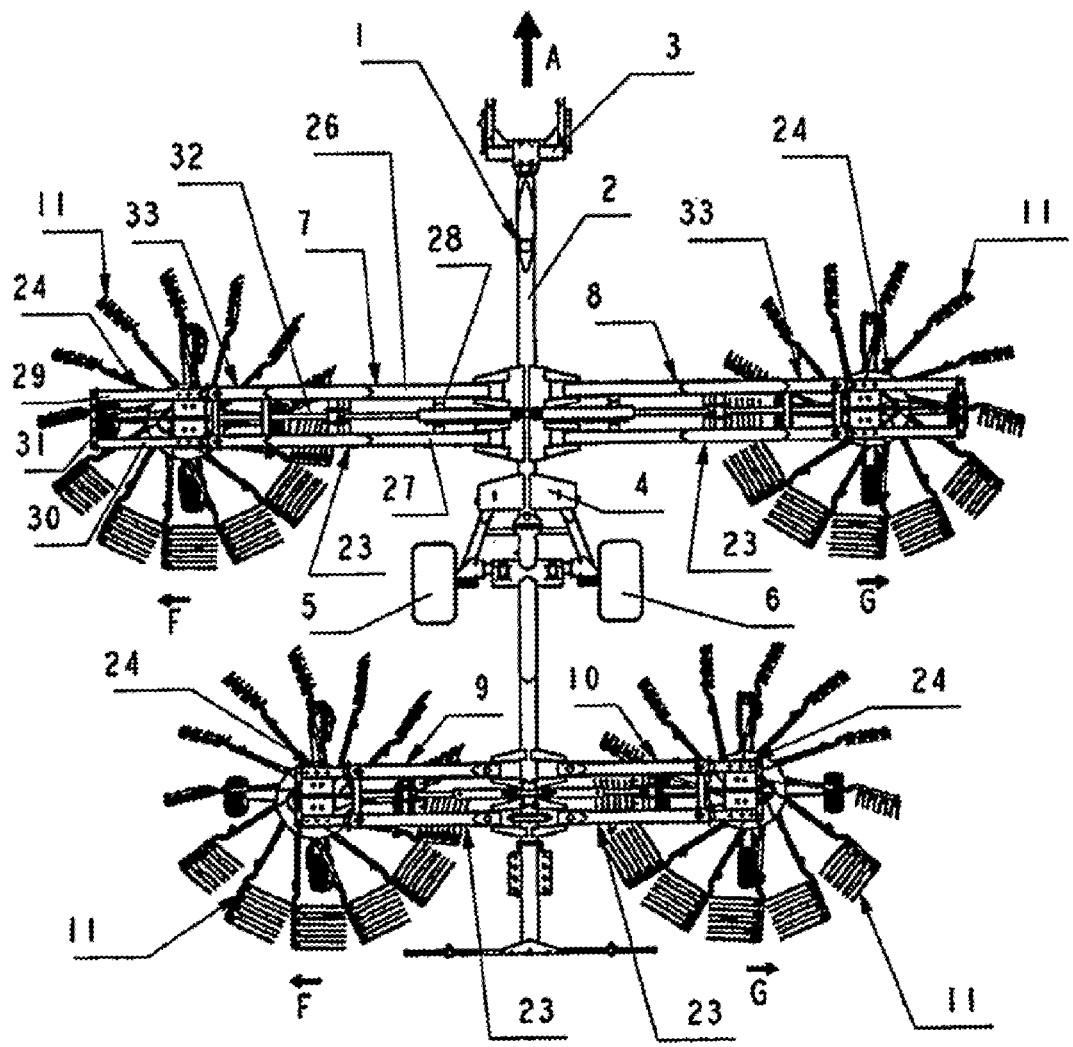
FIG. 1 depicts a view from above of a machine according to the invention.
Figure 2:
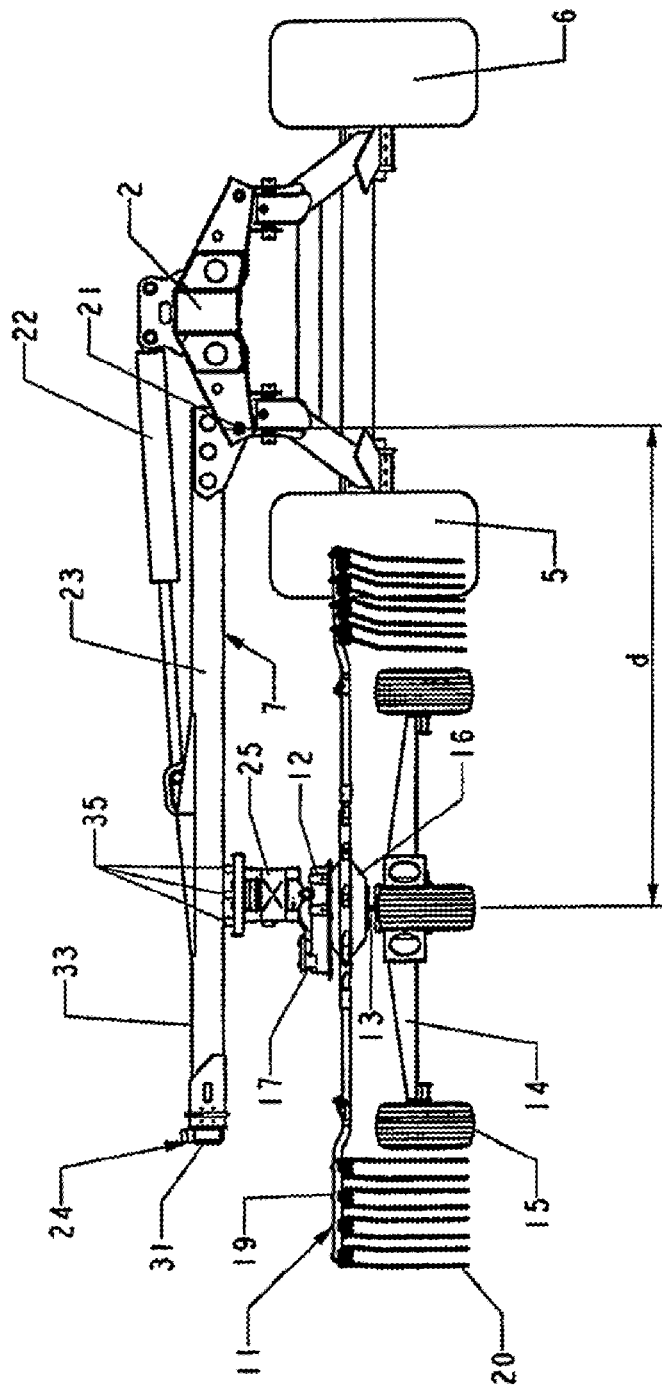
Figure 3:
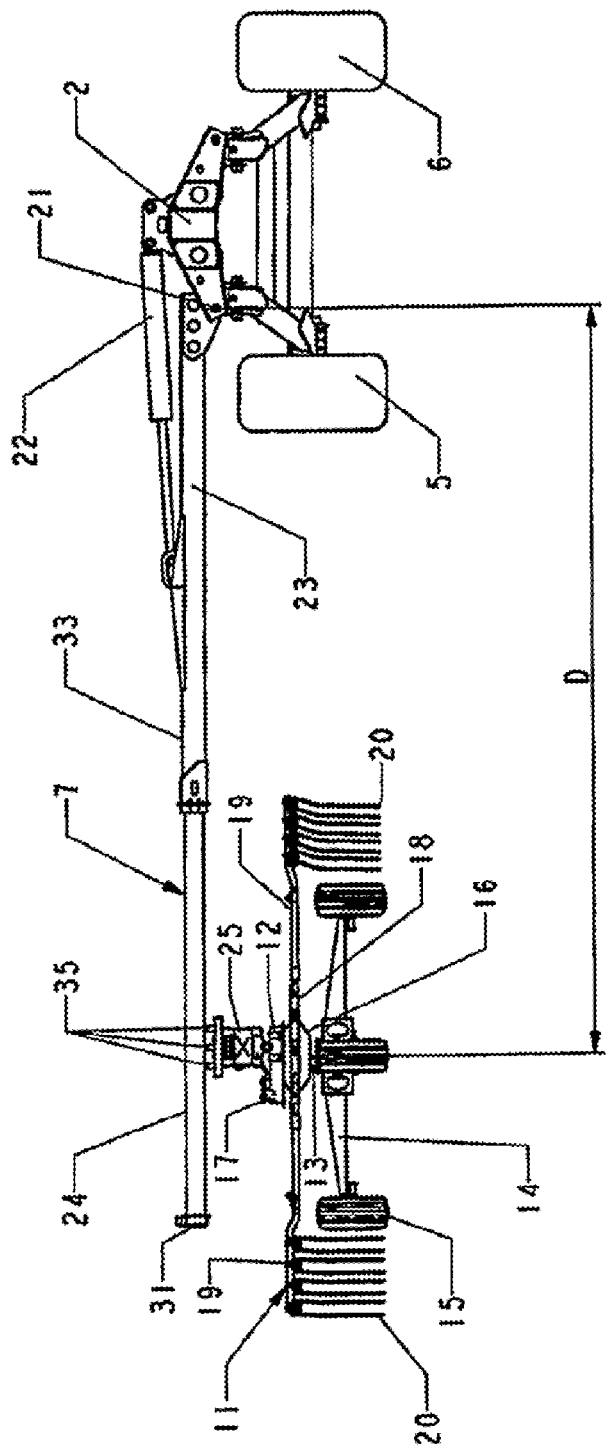

It is certified that error appears in the above-identified patent and that said Letters Patent is hereby corrected as shown below:

The drawing sheet, consisting of Fig. 1 – 3, should be deleted and replaced with drawing sheet, consisting of Fig. 1 – 3, as shown on the attached page.

Signed and Sealed this

Fifteenth Day of January, 2008

JON W. DUDAS
*Director of the United States Patent and Trademark Office*